Figure 1:
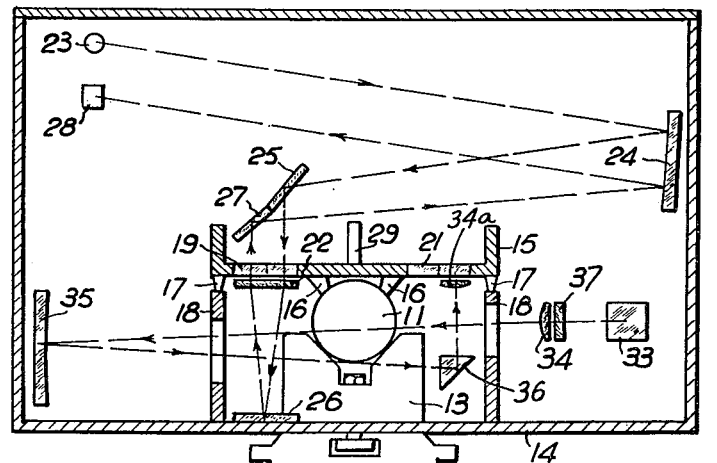

April 10, 1962     J. M. BURCH     3,028,787
COPYING OF SCALES

Filed May 5, 1959                                   4 Sheets—Sheet 1

INVENTOR
JAMES MORRISS BURCH

BY    *Lawson and Taylor*

INVENTOR
JAMES MORRISS BURCH

INVENTOR
JAMES MORRISS BURCH 3,028,787
COPYING OF SCALES
James Morriss Burch, Surbiton, England, assignor to National Research Development Corporation, London, England, a British corporation
Filed May 5, 1959, Ser. No. 811,084
Claims priority, application Great Britain May 5, 1958
16 Claims. (Cl. 88—24)

This invention relates to the copying of scales in such a manner that the copies are more accurate than the originals from which they are made. The invention involves means for averaging the error in two original scales during the production of the copy scale. The scales may be linear or angular.

The invention is concerned with scales in which the graduations are very closely spaced as in diffraction gratings and the scales may in fact be diffraction gratings. The copies may also be diffraction gratings or they may be used for metrological purposes, or for the control of machine tools and other machines.

According to the invention the two scales from which the copy is to be made are traversed, one in relation to the other, in such a way as to produce moiré fringes over a substantial aperture and the moiré fringes are caused to produce a signal which is recorded on a receiver moved relative to the signal source. It would be possible to use an intense light source to form the moiré fringes, to receive the fringes on a diffuser, and then "pipe" these fluctuations of incident light round on to a slit or a small stationary grating, the latter being directly imaged on to a photographic plate, the spacing of the grating being such that its image on the plate is the same as that of the scale being made. It is preferred however to cause the moiré fringes to fall on a photo-electric cell the signal from which is used to produce the record. Thus the signal may control the exposure of a photographic emulsion on a rigid support so that after processing an optically active scale is produced on the emulsion. According to the method of processing the scale may consist of cyclically varying absorption, refractive index or physical relief or some combination of these attributes. The line spacing of the scale will be determined by the line spacing of the two original scales but provided any error in the two original scales is not too great and provided that the control of the recording e.g. exposure of the emulsion, by the signal from the photo-electric cell is not allowed to introduce phase errors, the accuracy of division of the scale thus produced by photography or otherwise will be substantially better than that of the two original scales. In the case of two similar angular scales averaged around their entire periphery the elimination of error is in fact substantially complete in a single stage. In any event the process can be repeated and a few repetitions will reduce the errors to a value at which the accuracy depends on such things as emulsion creep and the stability of the rigid support.

It will be understood that the direction of relative movement of the two original scales depends on whether they are linear or angular. If they are linear it will be a linear movement and if they are angular it will be a rotational movement.

Figure 4:
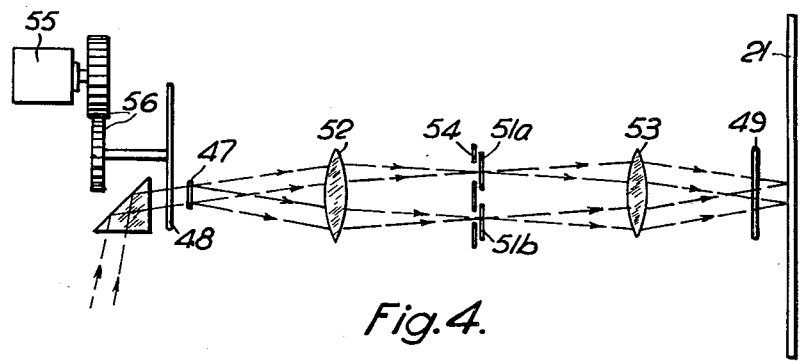
Figure 2:
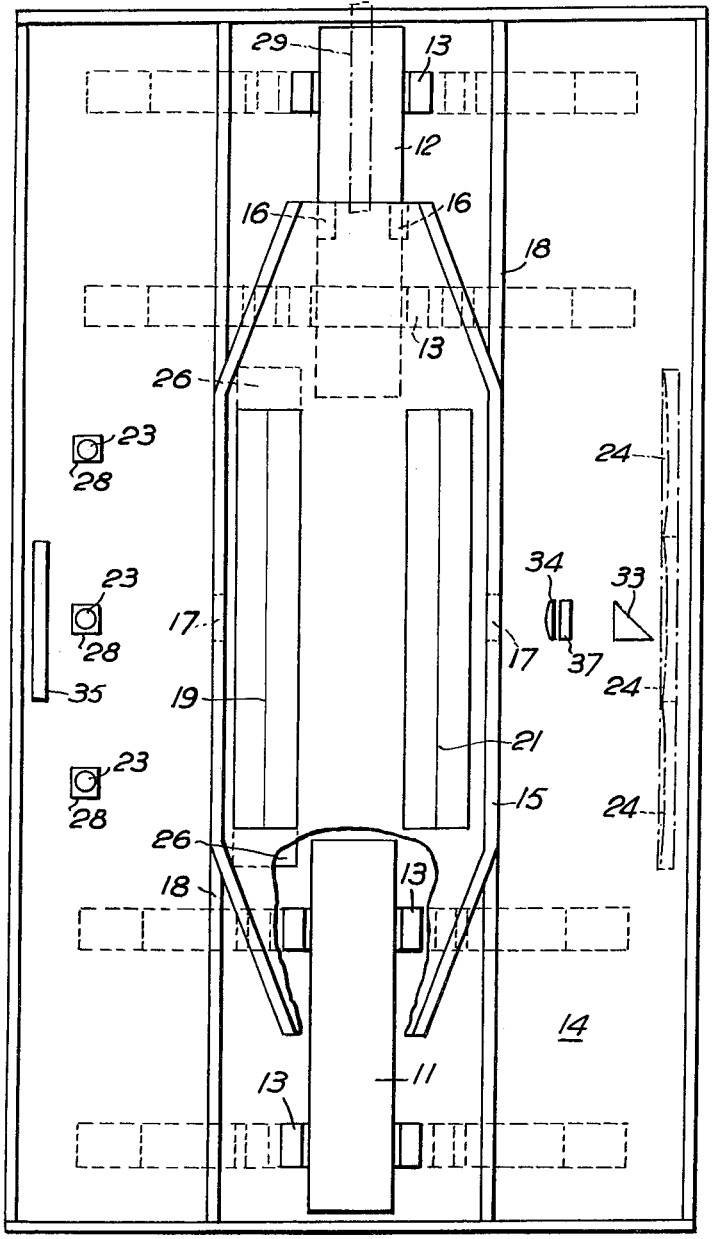
Figure 3:
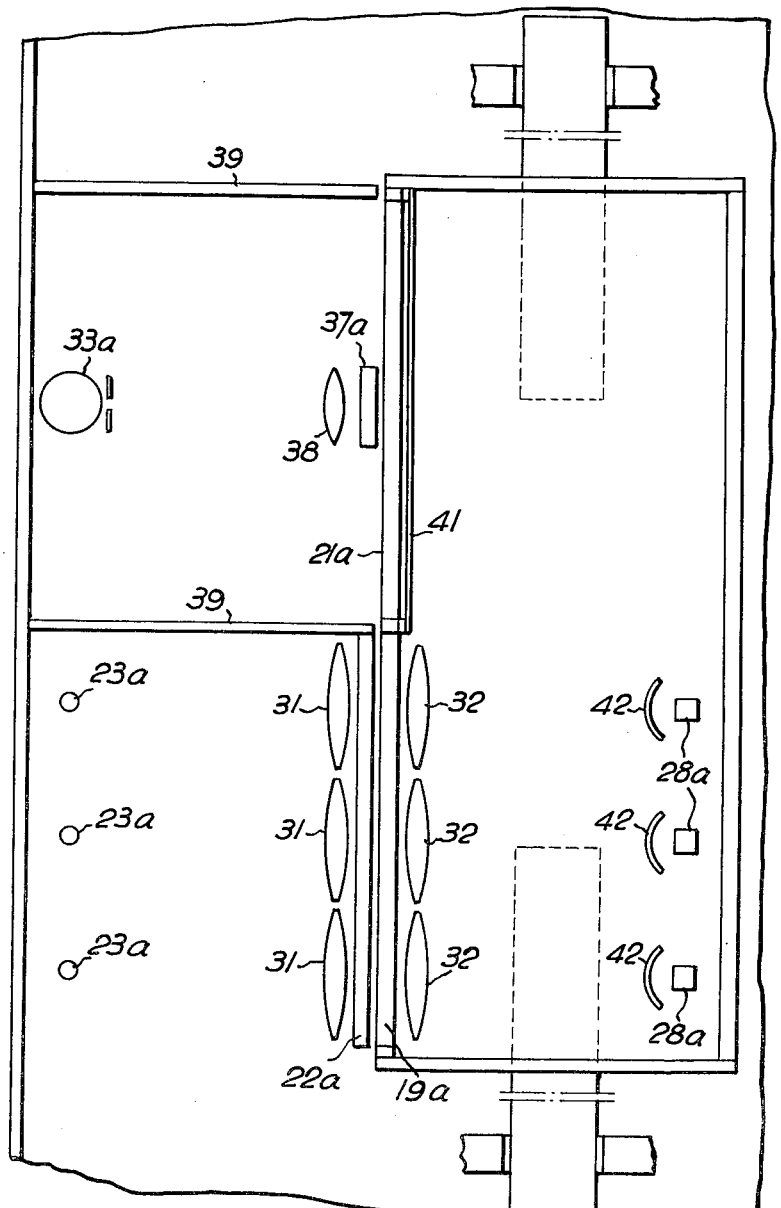
Figure 5:
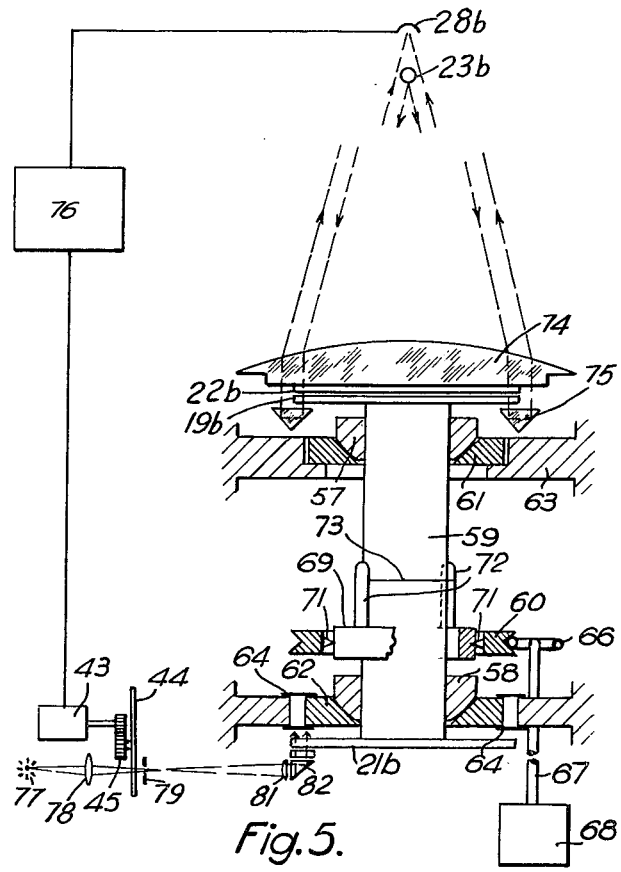
Figure 6:
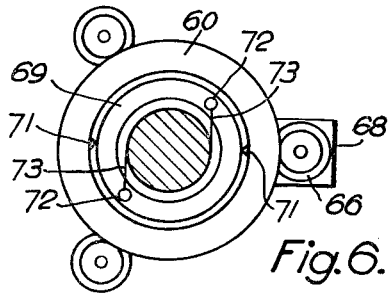

The invention will be further described with reference to the accompanying diagrammatic drawings in which:

FIGURE 1 is an end view with parts in section of an arrangement of apparatus for copying a linear scale in accordance with the invention, FIGURE 2 is a plan view of FIGURE 1 with some parts removed, FIGURE 3 is a plan view of a modification of the apparatus shown in FIGURES 1 and 2, FIGURE 4 is a diagram illustrating a further method of effecting the photographic exposure, FIGURE 5 is an elevation partly in section of apparatus for copying an angular scale in accordance with the invention, FIGURE 6 is a plan of a detail of FIGURE 5.

The linear apparatus illustrated in FIGURES 1 and 2 comprises a guideway consisting of two horizontal hardened steel cylinders 11, 12 spaced apart axially on V-blocks 13 on a firm main support 14. The cylinders are carefully lined by autocollimator or by interferrometric alignment devices so as to point in the same direction at infinity although not necessarily exactly coaxial. The cylinders 11, 12 support a moving cradle 15 by a pair of low friction, e.g. boron nitride, contact pads 16 engaging each cylinder after the fashion of a V-block, rocking of the cradle about the longitudinal axis being prevented by engagement of two contact pads 17 at the centre of the cradle with two horizontal straight edges 18 on either side parallel to and in the same horizontal plane as the contact pads 16. The two straight edges 18 are adjusted to remove through the centre contact pads 17 most of the gravity sag of the cradle. These two contact pads 17 are lubricated with oil of correct viscosity to ensure full hydrodynamic lubrication at very slow speeds (around one inch per minute) and this introduces a desirable degree of damping into the system. The only effects of variation in the thickness of the oil film will be in the vertical position of the cradle. The contacts of pads 16 with the cylinders 11, 12 are left unlubricated.

On one side of the mid-line the cradle carries one of the original scales 19 and on the other side a photographic plate 21, this scale and plate lying in the same horizontal plane. The drawing is diagrammatic and to avoid complication shows this horizontal plane above that in which the areas of contact of the pads 16 with the cylinders 11, 12 and of the pads 17 with the straight edges 18 lie, but the two planes should in practice preferably coincide. The other original scale 22 is supported from the main support so that the only disturbance of the cradle which can introduce a spurious phase shift between the translation of one scale past the other and the translation of the plate past the travelling fringe pattern will be rotation in azimuth. With careful construction and alignment of the cylinders this can be reduced to perhaps $\pm 10^{-6}$ radian and if the scale and plate are five inches apart the linear errors should not exceed $\pm 5$ microinches.

To obtain a signal averaging a length of each of the scales 19, 22 a light source is provided at 23. The light from this falls on a concave mirror 24 serving as a collimater and the parallel beam formed thereby is directed by an inclined plane mirror 25 through the two scales 19, 22 on to another plane mirror 26. The relative inclination of the mirrors 25, 26 is such that the returned beam misses the scales 19, 22 and passes through the transparent material of the scale supports on to another inclined plane mirror 27 beside the mirror 25 which returns the beam to the concave mirror 24 from which it is concentrated on to a photo cell at 28. The relative inclination of the mirrors 25, 27, the radius of mirror 24 and the position of the light source 23 are such that the cell 28 needs to be located quite close to the light source 23 to have the return beam sharply concentrated on it. To assist in setting up the apparatus the mounting for the cell 28 may be arranged to receive a telescope in its place by which visual observation can be effected while adjustment is being made of the various optical elements.

It will be understood that in the transverse plane as in FIGURE 1 no great width of beam is necessary at 23, 28 while at 19, 22 it only needs to be wide enough to illuminate a convenient width of the two scales. But in the longitudinal direction since it is the averaged signal from the photo cell 28 which is used to control the exposure of the photographic plate 21, the length of the mirror 24 in this direction as shown in FIGURE 2 is substantially greater than its width as seen in FIGURE 1. For example if the radius of curvature of the mirror 24 is 36 inches so that the light source 23 and cell 28 are at 18 inches from it there is no difficulty in providing a width of beam as seen in FIGURE 2 of 8 inches. It is preferred to use a number of light sources and cells with mirrors 24 placed end to end so that the total aperture of the beam can be made equal to the length of the scales. With the above sizes if the scales are 24 inches long this involves three light sources, three mirrors and three cells as indicated in FIGURE 2. The two cylinders 11, 12 are of substantially the same length and the axial spacing between them is also the same length. This axial spacing enables the direction of the beams to be chosen without difficulty due to the cylinders getting in the way. However with both scales of the same length as here assumed the full length of both scales can only be in register at one instant and except for this one instant an averaging effect over a shorter length must be accepted. The minimum aperture of the beam which can be accepted depends partly on what length of overlap is deemed necessary to provide adequate correction and partly on the variations in intensity of illumination of the photo cell which can be dealt with. The former is the more important factor because the latter can readily be dealt with by a small range of automatic or manual gain control in the amplifier to which the output of the cell is applied.

As a result of the acceptance of a minimum aperture less than the length of the scale it becomes possible to produce a copy scale the length of which is equal to the sum of the lengths of the scales 19, 22 less twice the necessary minimum aperture of the beam. As the averaging effect depends on a finite length of the two scales being covered by the aperture of the beam used, in general the greater the aperture the better.

In practice using high quality diffraction gratings of equal lengths as the original scale it becomes possible to make a copy which is say one third longer than the originals and from two copies thus prepared, the same increase can be obtained and so on, so that as regards linear scales the invention not only allows the accuracy to be improved but also an increase in the length of the improved copy, a valuable feature for many metrological purposes for which long scales are in demand.

It will be understood that in operation to get the required signal the cradle is steadily and smoothly moved for example by the aid of a belt drive indicated at 29.

With relatively coarse original scales 19, 22 which can be regarded as the "line and bar" absorption type and with a separation between the two of less than the scale interval, diffraction effects may be ignored and the photo-electric cell will receive a sinusoidal moiré fringe pattern and if the two scales were perfect every point of the overlap field would brighten and darken in phase. If there are imperfections some parts will be in advance of others, but the cell averages these discrepancies and gives a smoothed output with smaller imperfections.

If a collimating mirror 24 which also serves for concentrating the light on to the photo cells is used the same arrangement serves equally well in the case of very fine scales in which for practical reasons the separation between the two scales 19, 22 must be greater than the scale interval.

As will be understood by those skilled in the art instead of using a mirror a collimating lens cooperating with an illuminated slit may be used to produce the beam and another lens may collect the collimated beam after passage through the scales. In this case the beam should again pass at approximately normal inclination to the overlapping portions of the two scales. With coarser scales nothing more is needed but with very fine scales with a greater separation than the scale interval, sinusoidal moiré fringes will still be received on the photo-electric cell if it is arranged for the cell to receive the first order spectrum diffracted at the minimum deviation angle and for only the (1,0) and (0,1) order-sequences to contribute to the pattern. The latter condition is readily satisfied with photographic originals for which the intensity of the second and higher order spectra can be made extremely low. Under minimum deviation any change in separation produces no phase difference between the two beams and leaves the moiré fringe intensity unaltered. Quite large separation can be used if the angular width of the entrance and exit slits is kept sufficiently small. For example with 10,000 per inch scales a separation of 0.005 inch will give fringes of about 60 percent visibility if the angular slit width does not exceed 0.01 radian. Aberrations in the collimating and collecting lenses and in the glass plates on which the scales are carried can be ignored provided they do not cause any light to miss the exit slit, because they affect both beams equally.

It can be shown that provided the initial scales contain imperfections not exceeding a quarter of the ruling width over an appreciable area satisfactory error smoothing will be obtained. If there are larger imperfections the scales can be masked at their extremities for the first stage. If very fine scales are to be produced and a good one of high dispersion is not available for use as an original (from which the second can be made photographically) it is possible to start with a coarse scale for which the quarter ruling width tolerance is easy to satisfy and to introduce some form of frequency multiplication as described below which produces from the signal from the photoelectric cell a scale of higher dispersion than the original.

It will be understood that the invention is not restricted to the mounting of one original scale 22 on a stationary support and traversing the other scale 17 past it on a movable cradle 15 which also carries the unexposed photographic plate 21 though this is generally convenient. Similarly it is convenient to arrange for the photo-electric cell and the exposure means controlled by it to be mounted on stationary supports.

As above mentioned the only risk of introducing phase errors into the copy on to the photographic plate is due to the risk of the cradle oscillating in azimuth. If the symmetrical layout of FIGURES 1 and 2 is departed from the possible error due to this cause can be substantially reduced by arranging the plate on the same side as the scale mounted on the cradle. One possible layout is shown in FIGURE 3. Here the cradle may be guided in substantially the same way as in FIGURES 1 and 2 but it is more convenient to arrange the scales 19a, 22a with their width set vertically and for the plate 21a to be arranged in end to end relationship to the scales 19a, 22a. This figure also illustrates the use of collimating and collecting lenses instead of mirrors. Thus there are three light sources 23a, three collimating lenses 31, three collecting lenses 32 and three photo-electric cells 28a. It may prove desirable to use a diffusing screen in front of each light source and another diffusing screen in front of each photo cell. The photo cells may be of the vacuum type or preferably of the lead sulphide type. Certain further features of this modification will be described later after a description of the exposure of the photographic plate.

The signal from the photo-electric cell 28 or 28a can control the exposure of the emulsion on the plate 21 or 21a in various ways. It would be possible to pass the signal through a capacitor to eliminate the direct current component and then by squaring the wave form and differentiating to derive short positive (or negative) pulses, each of which occurs at the moment when the instantaneous voltage crosses the average which has been obtained by the time constant of the capacitor. These pulses could then be used to trigger an electronic flash tube which images a stationary slit on the moving plate. Circuits which will effect those operations are well known.

In order to get more light on to the plate and to average any vagaries in the triggering of the flash tube, a perferable method would be to use the image not of a single stationary slit but of a small portion of grating, say half an inch square and containing, in effect, several thousand slit-images. The small stationary grating would have to be reasonably accurate but only to a quarter fringe limit, and the imaging system would have to produce the correct final spacing desired for the copy scale, again to the Rayleigh limit. (See Van Nostrand, Scientific Encyclopedia, 3rd edition, 1958 under "Resolving Power," or R. W. Wood, Physical Optics, MacMillan, 3rd edition, page 251.) The final scale under these conditions is averaged yet again, being derived by a triple convolution of the two original scales and of the small stationary grating.

The general layout for the purpose in view is indicated in FIGURES 1 and 2. Here collimated light from a flash tube is introduced conveniently by the aid of a right angle prism indicated at 33 serving as a reflector. The light illuminates a slit or preferably a stationary grating 37 of the appropriate spacing as above explained and this is imaged by a concave mirror 35 and a plane reflector 36 which may conveniently be formed on a right angle prism, on to the plate 21. To avoid any risk of change in magnification at the plate 21 due to slight vertical displacements as the cradle moves, two lenses 34, 34a forming an afocal system may be included. The light should be monochromatic and can be filtered for this purpose.

A corresponding arrangement is shown in FIGURE 3 in which the light source is indicated at 33a and a collimating lens at 38 and a small stationary grating at 37a. In this case the plate 21a is shown closely arranged end to end with the moving scale 19a so that in the course of its traverse the plate will move partly in front of the stationary scale 22a. It is therefore necessary to avoid the plate from being photographically exposed by light coming through the scale 22a. One convenient way is to use a green light for exposing the plate and a red light for exciting the photo-electric cells. Gross leakage of light is prevented by screens 39 forming a compartment in which the photographic exposure is made. This is necessary to avoid feed back due to light from the source 33a affecting the photo cells 28a. To reduce the disk still further there may be a mask 41 extending from the scale 19a behind the plate 21a and there may also be filters as at 42, in front of the photo cells 28a which pass red light but prevent green light from getting through. Red light is in fact very suitable for exciting photo-electric cells while it is easily possible to obtain a strong green light from a flash tube of suitable character.

Alternatively to using a flash tube a mechanical shutter may be used actuated by a synchronous motor the supply to which is furnished by the photo cell output if necessary after amplification.

Synchronous motors which will not themselves introduce phase errors once steady operating conditions have been reached are readily obtainable and the rate of traverse of the scale 19 past the scale 22 may be such as to give a suitable frequency for such a motor for instance 50 cycles per second or even up to 400 cycles per second. The same frequencies are also suitable for operating a flash tube and they may also be used in connection with angular scales the production of which is described below.

An example of a synchronous motor and shutter is shown in FIGURE 5, the motor being indicated at 43, the shutter at 44 and toothed wheel gearing between the motor and shutter at 45. This arrangement readily allows for a difference in scale spacing between the copy and the original scale since the change speed gearing 45 can be changed and also the number of openings in the shutter can also be changed by substituting one shutter disc for another. There is no practical difficulty in providing change speed gearing or shutter discs of adequate accuracy to avoid the introduction of unacceptable errors. It may here be mentioned that a change of scale can also be provided in conjunction with an electronically triggered flash tube by the introduction of an electronic multiplying or dividing circuit between the photo cell and the trigger circuit.

Yet another alternative is illustrated in FIGURE 4. Here an optical system casts the image of a wholly stationary small grating 47 formed by a wholly stationary lens or mirror system and illuminated by a steadily shining source on to the photographic plate 21 (which is moved as in FIGURES 1 to 3 or as in FIGURE 5 described below) but which causes the image to move with the photographic plate. In essence this optical system includes a polariser 48 and analyser 49 and two quarter wave plates 51a, 51b between the polariser and analyser, arranged to produce circularly polarised light to opposite hands. It can be shown that by rotating either the polariser or the analyser at an appropriate speed the fringe pattern i.e. the image of the grating will steadily travel along a straight line which is arranged to be in the direction of travel of the photographic plate. The system also includes an afocal system of unit magnification for projecting the image, for example two identical lenses 52, 53 separated by the sum of their focal lengths and the two quarter wave plates 51a, 51b are included between these two lenses 52, 53. These may also be a mask 54 with two openings in the focal plane midway between the lenses 52, 53 to allow only two of the diffraction spectra produced by the small grating 47 to reach the second lens 53. It is most convenient to rotate the polariser since this will be further away from the travelling plate. It will be understood that the small grating must be of the same line spacing as is required at the photographic plate. The necessary rate of rotation of the polariser is obtained on the lines described above by feeding the photo-electric cell signal, after any necessary amplification in which as far as possible phase shift as made independent of slight frequency variation, into a synchronous motor 55 which directly or through gearing 56 rotates the polariser 48 at 180° per cycle of applied current. With this arrangement any vibrations from the polariser shaft are effectively isolated from the imaging system.

This system again readily enables a change of line spacing between the copy and the two original scales to be produced. It suffices for the small grating 47 from which the image is obtained to have the appropriate line spacing and to give the change speed gearing 56 between the motor shaft and polariser the appropriate ratio. The polariser and analyser are conveniently of such material as "Polaroid."

The application of the invention to the case of angular scales is illustrated in FIGURES 5 and 6. Here a vertical axis of rotation is used and the rotor consists of a pair of hardened steel spherical annuli 57, 58 mounted on a hardened steel cylinder 59 to form a rigid and thermally stable assembly. The two spherical convex surfaces are optically lapped and run as a self-aligning shaft in two stationary female cones 61, 62 which both face upwards, the upper cone 61 being fixed rigidly to a base casting 63 while the lower cone 62 is given a very slight flexural degree of freedom by spring supports 64 to translate vertically, adjustments (by screws or the like not shown) being made until both bearings support the same load. After assembly the circular rims of contact between the rotating annuli 57, 58 and stationary cones 61, 62 may be lapped in situ with oil and abrasive to remove any lack of revolution symmetry in the cones;

the rotor can be raised slightly, freed from abrasive, and lubricated with oil of just sufficient viscosity so that when the shaft is rotated at the desired speed, which may be as slow as five revolutions per hour, the rotor is hydrodynamically lubricated and free from wear and stick-slip effects. A pure torque drive is applied by any convenient means.

Thus there may be a pulley 60 surrounding the shaft 59 with considerable clearance, the pulley conveniently being located by three rubber tyred wheels one of which appears at 66. This particular wheel serves to convey the drive from a motor 68 through a shaft 67. An inner member 69 also surrounds the shaft with considerable clearance and is pivoted at 71, 71 to the pulley 60 on a diametral axis perpendicular to the shaft 59 so that the member 69 can rock. Two diametrically opposite axial members 72 are carried by the member 69 and to their ends are secured belts 73 wrapped round and if necessary fastened to the shaft 59, the belts being tangential to the shaft 59 at points on the axis 71—71. Consideration will show that the only forces which can be transmitted through this system is a direct pull on each of the belts 73 and since these are exactly oppositely disposed only a pure torque can be conveyed to the shaft 59 irrespective of the accuracy of centering and mounting of the drive.

The upper end of the shaft 59 carries one 19b of the two original scales and the lower end carries the photographic plate 21b. Annular Fresnel-type components of transparent acrylic plastic comprising a helicoidal condenser 74 above the scales (the condenser conveniently serving to support the stationary scale 22b) and an annular total reflecting prism 75 below enable a single light source 23b to illuminate the whole periphery of the two original scales but the rays returning outside the scales but through the condenser and the moiré signal being picked up by a single photo-electric cell 28b—conveniently a germanium photo-diode. The signal from the cell 28b is amplified at 76 and then supplied to the motor 43 driving the shutter 45 as described above. The light source is indicated at 77, a condenser at 78, a slit at 79, a collimating lens at 81 and reflector at 82. In imaging the travelling fringe pattern on to the photographic plate, complete compensation for any residual nutation of the shaft can be effected by re-imaging the pattern, after it has first impinged on the emulsion, on to a second diametrally opposite portion of the periphery.

As above explained a change of scale can be produced for instance by changing the gearing or shutter disc. Also instead of a shutter the arrangements described above with reference to FIGURE 4 can also be used in the production of angular scales.

As well as providing change speed gearing in any of these arrangements, electronic multiplying or dividing can be used in the circuit between the photo-cell and the synchronous motor, being for instance combined with the amplifier 76 in FIGURE 5. It is equally possible to use a triggered flash tube in the production of angular scales.

As a specific example in the case of an angular scale it is possible to produce a scale having any desired total number of lines—for example $10^5$, $2^{17}$ or one line for every six seconds of arc would all be possible configurations.

In both the linear and rotary apparatus alignment controls will be arranged on kinematic principles in order that the original scales may have correct mutual orientation. Adjustment of these controls will be done preferably by visual "fluffing out" of the moiré fringe pattern.

For both linear and angular scales a powerful light source is desirable to keep exposure time down so that demands on thermal and mechanical stability are more easily satisfied. By using a forced-air cooled mercury arc of say 900 watts which provides a slit shaped source 25 mm. by 1 mm., and suitable filters, approximately monochromatic light centred on either the blue line 4358 A. or the green line 5461 A. forming a very intense source can be obtained. This enables comparatively high moiré fringe frequencies to be used for which synchronous motors are readily available (e.g. 50 or even 400 cycles per second), without difficulty due to under-exposure even with colloidal or grainless types of emulsion as described by Crawford in Jnl. Sci. Inst., vol. 31, pp. 333–5, September 1954.

If it becomes necessary to work at a frequency below 50 cycles per second it may prove preferable to use a flash tube in the place of a shutter or polariser driven by a synchronous motor. As above mentioned electronic circuits used for this purpose may include circuits for multiplying or dividing the frequency. Frequency doubling can easily be provided for by arranging for both positive and negative pulses to trigger the flash tube. Frequency division enables coarse scales of equal accuracy to the original scale to be produced when the original scales themselves are very finely divided. Frequency division and multiplication also enables composite scales and coded scales at decimal or binary systems to be provided. When a rotating shutter is used the transmitting portions should have about a third the length of the opaque portions.

It should also be mentioned that if both linear and angular scales are to be copied it can usually be arranged for the same light source to serve either system. Thus the filtered light may be imaged to fill a stationary slit and the synchronous motor and polariser or shutter are mounted on vibration pads immediately behind the slit. The light is then collimated and fed by two 90° reflections so as to avoid elliptical polarisation effects into either the linear or radial apparatus proper.

Both linear and angular apparatus may be mounted each on three shock absorbent supports so as to be independent of each other and of the motor and lamp units, but all the equipment except the lamp may be mounted on the same firm steel table. The lamp is mounted several feet away and the heat which is produces is prevented from reaching vicinity of the table. Also common to both apparatuses and removed from the immediate neighbourhood of the table will be the amplifier and monitoring apparatus the function of which is to amplify the photo-electric signal into a form suitable for driving the synchronous motor and to display phase information on an oscilloscope.

In general the two originals will be copies or replicas of the same master and thus be of the same size and have substantially the same errors but provided their spacing is nominally the same this is not essential.

After copies of satisfactory accuracy have been obtained by carrying out the process of the invention as many times as may be necessary further copies can then be produced by direct photographic printing especially by the methods described in my co-pending application Serial No. 799,625, filed March 16, 1959. Alternatively they can be used to generate photoelectrically a signal which is recorded in some other way for example on magnetic tape or on printed circuits. Indeed the signals from the last stage of correction by the method of the invention instead of being photographically recorded may be recorded in some such other way.

I claim:

1. Apparatus for making a copy scale having closely spaced graduations comprising a support for a first scale having closely spaced graduations, a carriage having a support for a second scale having graduations of the same spacing as said first scale, means for guiding and moving said carriage in a path such that the support for the second scale is moved past the support for the first scale at a close constant distance, a further support on said carriage for a photographic plate, means for directing a collimated beam of light of substantial aperture through the first and second scales on their respective supports, a photoelectric cell, means for concentrating the light transmitted through the first and second scales upon the photoelectric cell, a light source, means for concentrating light therefrom upon the photographic plate on said further support, and means actuated by the signal from the photoelectric cell for controlling the light from said light source falling on the photographic plate.

2. Apparatus as set forth in claim 1 in which said means for controlling the light falling on the photographic plate includes means for changing the frequency of the signal from the photo-electric cell.

3. Apparatus as set forth in claim 1 wherein said light source is a flash tube, and said means actuated by the signal from the photo-electric cell includes a trigger circuit controlling the flash tube.

4. Apparatus as set forth in claim 1 for making a linear scale in which the carriage is a cradle guided on two substantially aligned cylindrical guides and two straight edges which eliminate rock about the axis of the guides.

5. Apparatus as set forth in claim 1 also including a grating through which the light by which the photographic exposure is effected is passed, this grating being so located and of such spacing that a multiple slit image of the spacing of the scale being made is produced on the photographic plate.

6. Apparatus as set forth in claim 1 wherein said means actuated by the signal from the photoelectric cell includes a synchronous electric motor and a shutter disc driven by said motor.

7. Apparatus as set forth in claim 6 in which changeable change speed gearing is included in the drive from the motor to the shutter disc.

8. Apparatus as set forth in claim 1 wherein said means actuated by the signal from the photo-electric cell includes a synchronous electric motor, a polariser rotated thereby, an analyser, two quarter wave plates between said polariser and analyser disposed to polarise light circularly to opposite hands, said polariser, quarter wave plates and analyser being interposed in the light from the source to the photographic plate with the analyser close to the photographic plate.

9. Apparatus as set forth in claim 8 in which changeable change speed gearing is included in the drive from the motor to the polariser.

10. Apparatus as set forth in claim 1 for making an angular scale in which the carriage comprises a turntable the apparatus also including a vertical spindle supporting the turntable, upper and lower spherical annuli on the spindle, respective cone bearings in which the annuli are journalled, and means for transmitting a pure torque drive to the spindle.

11. Apparatus as set forth in claim 10 wherein the aperture of the beam extends over the complete circle.

12. Apparatus as set forth in claim 11 including a condenser concentrating light from a source and directing it through the two scales, and an annular reflecting prism returning the transmitted light clear of the scales on to the condenser, the photo-electric cell being located at the place on to which the condenser concentrates the returned light.

13. Apparatus as set forth in claim 1 for making a linear scale in which the carriage is a cradle and the carriage guiding means comprises two substantially aligned cylindrical guides and two straight edges to the side of said cylindrical guides, said carriage sliding on said cylindrical guides and contacting said straight edges thereby to eliminate rock about the axis of the cylindrical guides.

14. Apparatus as set forth in claim 13 in which the photographic plate is disposed in end to end relationship to the second scale, the apparatus also including a partition and a mask to form a compartment in which the photographic exposure is effected, this exposure being effected with light of a different colour from that used for illuminating the photo-electric cell.

15. Apparatus as set forth in claim 13 including a concave mirror to receive and collimate the light which illuminates the two scales, an inclined mirror which redirects light from the concave mirror through the two scales on their respective supports, a second plane mirror which returns the light clear of the scales, and a third inclined mirror which redirects the returned light to the concave mirror, the photo-electric cell being disposed at the point on which the concave mirror concentrates the returned light and the mirrors and other parts being so disposed that the position of the photo-electric cell is close to the source of light originally received and collimated by the concave mirror.

16. Apparatus as set forth in claim 13 in which the two scales are disposed on one side of the cylindrical guides and the photographic plate on the other, the apparatus also including a concave mirror and reflector for concentrating the light for the photographic exposure, and an afocal system included in the light path to the photographic plate to maintain the magnification at the photographic plate constant.

References Cited in the file of this patent

UNITED STATES PATENTS

| | | |
|---|---|---|
| 2,488,091 | Meech | Nov. 15, 1949 |
| 2,861,345 | Spencer | Nov. 25, 1958 |
| 2,886,718 | Shepherd et al. | May 12, 1959 |